United States Patent Office 3,538,782
Patented Nov. 10, 1970

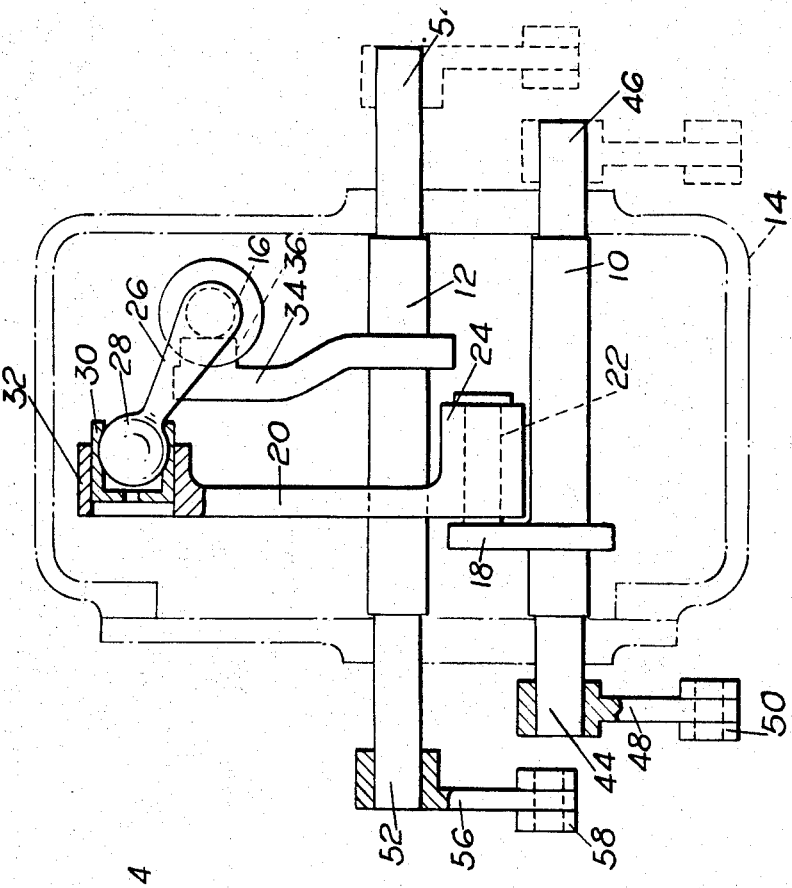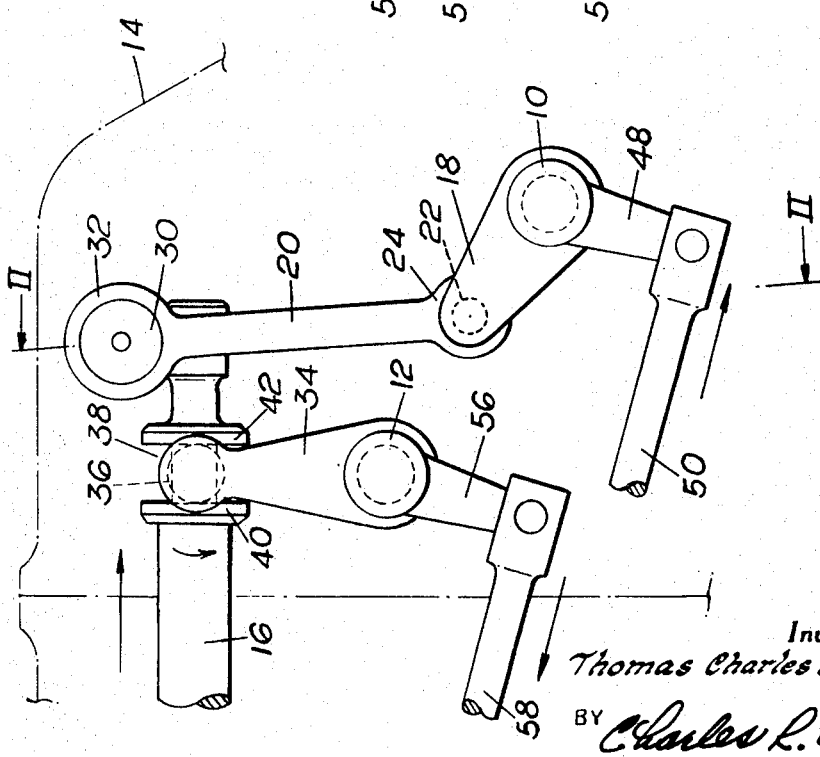

3,538,782
GEAR SELECTOR MECHANISMS
Thomas Charles Felix Stott, Harpenden, England, assignor to General Motors Corporation, Detroit, Mich., a corporation of Delaware
Filed Sept. 16, 1968, Ser. No. 762,305
Claims priority, application Great Britain, Oct. 13, 1967, 47,039/67
Int. Cl. G05g *13/04*
U.S. Cl. 74—473                7 Claims

ABSTRACT OF THE DISCLOSURE

A gear selector mechanism, primarily for use in conjunction with a gearbox of a motor vehicle, includes first and second cross shafts which are rotatably mounted in a housing, transversely to a selector shaft which is mounted for both rotary and axial movement. For producing the rotary and axial movements of the selector shaft there are, respectively, first and second crank arm connections from the respective cross shafts. The first crank arm connection also includes a link member having at one end a hinge connection to the crank arm of the respective cross shaft allowing movement of the link member only in a plane substantially radial to this cross shaft; the other end of the link member includes a socket in which a bushing is slidable in a direction normal to the said radial plane, and the socket accommodates a ball end of a crank arm fixed to the selector shaft.

A pair of longitudinally movable rods are pivotally connected to crank-arm actuator levers of the two cross shafts, for producing selective rotary movement of the cross shafts.

---

This invention relates to gear selector mechanisms, for example for use in selecting and engaging slidable coupling members of a motor vehicle gearbox.

In a gear selector mechanism according to the invention: first and second cross shafts are rotatably mounted in a housing, transversely to a selector shaft which is mounted for both rotary and axial movement; the first cross shaft carries a crank arm which has a hinge connection to one end portion of a link member, such that the link member can move in one plane only, and the selector shaft carries a crank arm having a spherically-surfaced free end portion which is accommodated in a bearing bush slidably mounted in a socket in the other end portion of the link member, the arrangement being such that the link member forms an articulated connection whereby rotary movement of the first cross shaft imparts a rotary movement to the selector shaft; and the second cross shaft carries a crank arm which cooperates with the selector shaft such that rotary movement of the second cross shaft imparts an axial movement to the selector shaft.

For producing the rotary movement of the cross shafts, an actuator lever may be fixed to one end of each of the cross shafts.

The two actuator levers may for example be disposed in the same side of the housing for the cross shafts. Since the cross shafts may project from either side of the housing, and the actuator levers may correspondingly be disposed on either side of the housing, little modification of the gear selector mechanism is necessary as between one version for use in a left-hand drive motor vehicle and another version for use in a right-hand drive motor vehicle, and there is no need for the two versions of the gear selector mechanism to have different internal arrangements.

The actuator levers may themselves be movable by being articulated to respective axially movable rods, which may for example extend in a common plane, for instance in a direction generally parallel to the selector shaft: this last-mentioned construction is convenient when the gear selector mechanism is to be controlled remotely from a position on the steering column of a motor vehicle.

The hinge connection between the crank arm on the first cross shaft and the link member may comprise a crank pin which is carried by the crank arm and extends into the interior of a hollow boss on the said one end portion of the link member. The hollow boss may be of elongated form, to give large areas in contact and thereby reduce wear.

The bearing bush which is slidably mounted in the socket in the said other end portion of the link member may have part of its interior of part-spherical form to conform to the shape of the spherically-surfaced free end portion of the crank arm carried by the selector shaft. This gives relatively large areas in contact and thereby reduces wear in this region. The bearing bush is conveniently made of a resilient material, with the bearing bush a spring fit on the spherically-surfaced end portion of the crank arm.

The crank arm which is carried by the second cross shaft preferably has at its free end a projecting crank pin which co-operates with a circumferential groove in the selector shaft, for producing the desired axial movement of the selector shaft without interfering with the rotary movement.

To allow the rotary and axial movement of the selector shaft to be used to select and engage movable coupling members (either slidable or pivotal) of a motor vehicle gearbox, the selector shaft may include an actuator projection or recess, preferably associated with a rotary interlock sleeve (for example mounted on the selector shaft), for co-operation with corresponding recesses or projections of movable coupling members of the motor vehicle gearbox, for example as disclosed in my U.S. patent specification No. 3,264,893.

The appended claims define the scope of the invention claimed. The invention and how it can be performed are hereinafter particularly described with reference to the accompanying drawing, in which:

FIG. 1 is a side view of one embodiment of a gear selector mechanism according to the invention; and FIG. 2 is a cross-section generally on the line II—II of FIG. 1, in the direction of the arrows.

In the embodiment of the gear selector mechanism according to the invention which is shown in the drawing, first and second cross shafts 10 and 12 are rotatably mounted in a housing 14, the cross shafts being disposed transversely to a selector shaft 16 which is mounted for both rotary and axial movement relatively to the housing 14. The cross shafts have shoulders which engage the housing for locating the shaft longitudinally. At the other end (not shown) of the selector shaft 16 there is an actuator projection, and an associated rotary interlock sleeve mounted on the selector shaft, for cooperation with corresponding recesses of a plurality of slidable coupling members, for establishing various gear ratios in a motor vehicle gearbox, the arrangement being one in which the rotary movement of the selector shaft causes the projection to select one of the coupling members, by entering the recess in that coupling member, and subsequent axial movement of the selector shaft slides the selected coupling member, to engage a corresponding gear ratio in the gearbox.

As is best seen in FIG. 1, the first cross shaft 10 carries a crank arm 18 which has a hinge connection to one end portion of a rigid link member 20. Specifically, the hinge connection comprises a crank pin 22 which is carried by the crank arm 18 and extends into the interior of an elongated hollow bearing boss 24 formed on one side of the end portion of the link member 20.

The selector shaft 16 carries a crank arm 26 having a spherically-surfaced ball portion 28 at its free end. The ball portion 28 is a spring fit in a cup-shaped bearing bush 30 which partly envelopes the ball portion and is slidably mounted in a socket 32 formed on one side of the other end portion of the link member 20, part of the interior of the bearing bush 30 being of part-spherical form to conform to the shape of the ball portion 28.

The second cross shaft 12 carries a crank arm 34, the free end of which cooperates with the selector shaft 16 by means of a pin 36 which projects from one side of the crank arm 34 into a circumferential groove 38 formed by an axially spaced pair of flanges 40 and 42 on the selector shaft 16.

Both ends 44 and 46 of the first cross shaft 10 project from the housing 14, an actuator lever 48 being fixed to the end 44 of the cross shaft. The actuator lever 48 is pivotally connected to a rod 50 which extends in a direction which lies in the same plane as the centre line of the selector shaft 16.

In a similar manner both ends 52 and 54 of the second cross shaft 12 project from the housing 14. A second actuator lever 56 is fixed to the end 52 of the cross shaft 12, and is pivotally connected to a rod 58 which, like the rod 50, extends in a direction which lies in the same plane as the centre line of the selector shaft 16.

The rods 50 and 58 are selectively movable in an axial direction by a remote control (not shown), which in this embodiment is mounted on the steering column of the motor vehicle. When the rod 50 is moved axially to the right, the connection by way of the actuator lever 48 causes the first cross shaft to rotate anticlockwise, as seen in FIG. 1. This anticlockwise movement is imparted to the crank arm 18, whcih, by reason of the hinge connection 22, 24, moves the link member 20 in a generally downward direction. During this movement the link member 20 is constrained to move in the plane of the paper in FIG. 1 because the boss 24 can only rotate about the axis of the pin 22. The downward movement of the link member 22 is imparted to the spherically-surfaced end 28 of the crank arm 26, so causing rotation of the selector shaft 16 in an anticlockwise direction as seen in FIG. 2, with the bush 30 sliding into the socket 32, namely in a direction normally out of the plane of the paper in FIG. 1. As already indicated, this rotary movement of the selector shaft results in selection of one of the coupling members in the gearbox.

When the rod 58 is then moved to the left, as seen in FIG. 1, the second cross shaft 12 is moved clockwise by the actuator lever 56, whereby the crank arm 34 is moved clockwise and allows the pin 36 to press against the right-hand flange 42 for movement of the selector shaft 16 to the right as seen in FIG. 1. The resulting movement of the selector shaft into its right-hand position produces sliding movement of the selected coupling member, for engagement of a corresponding gear ratio in the gearbox.

The embodiment of the gear selector mechanism according to the invention which has just been described is simple and compact. The selector shaft and the cross shafts can be disposed almost completely within the housing, and thus be lubricated by oil contained within the housing. Only the ends of the cross shafts which carry the actuator levers 48 and 56 need to project from the housing: the other ends could terminate short of the outer surface of the housing, and the apertures at the outer surface of the housing could be closed by oil-tight plugs. The actuator levers could if desired be located on the other side of the housing, as shown by interrupted lines in FIG. 2, or alternatively there could be one actuator lever on each side of the housing. This possibility of varying the positions of the actuator levers allows the gear selector mechanism to be used in both left-hand drive and right-hand drive versions of a motor vehicle, since it avoids any need for two versions of the gear selector mechanism to be made with different internal arrangements.

The embodiment of the gear selector mechanism which has been described can be made with very little lost motion, and therefore give a positive gear-change action. Also, very little wear is to be expected at the joints at the two ends of the link member 20, since the wearing surfaces are relatively large, both at the hinge connection 22, 24 and at the pivotal-and-sliding connection 28, 30, 32. The link member 20 could if desired be made as a die-casting.

I claim:

1. A gear selector mechanism comprising a housing, a selector shaft, first and second cross shafts supported by the housing and rotatably mounted within the confines of the housing and disposed transversely to the selector shaft, said selector shaft being mounted for both axial and rotary movement in the housing, a first crank arm carried by the first cross shaft, a hinge connection between the crank arm and one end portion of a link member such that the link member can move in one plane only, a second crank arm which is carried by the selector shaft and has a spherically-surfaced free end portion which is accommodated in a bearing bush slidably mounted in a socket in the other end portion of the link member, the arrangement being such that the link member forms an articulated connection whereby rotary movement of the first cross shaft imparts a rotary movement to the selector shaft, and a third crank arm which is carried by the second cross shaft and means connecting said third crank arm to the selector shaft such that rotary movement of the second cross shaft imparts an axial movement to the selector shaft.

2. A gear selector mechanism comprising first and second cross shafts rotatably mounted in a housing transversely to a selector shaft which is mounted for both axial and rotary movement, a first crank arm carried by the first cross shaft, a hinge connection between said crank arm and one end portion of a link member such that the link member can move in one plane only, a second crank arm which is carried by the selector shaft and has a spherically-surfaced free end portion which is accommodated in a bearing bush slidably mounted in a socket in the other end portion of the link member, the arrangement being such that the link member forms an articulated connection whereby rotary movement of the first cross shaft imparts a rotary movement to the selector shaft, a third crank arm which is carried by the second cross shaft and means connecting said third crank arm to the selector shaft such that rotary movement of the second cross shaft imparts an axial movement to the selector shaft, first and second actuator levers which are disposed on the same side of the housing and are fixed to the ends of the respective cross shafts, and first and second axially movable rods pivotally connected to the respective actuator levers.

3. A gear selector mechanism comprising first and second cross shafts rotatably mounted in a housing transversely to a selector shaft which is mounted for both rotary and axial movement, a first crank arm carried by the first cross shaft, a hinge connection between said crank arm and one end portion of a link member such that the link member can move in one plane only, a second crank arm which is carried by the selector shaft and has a spherically-surfaced free end portion which is accommodated in a bearing bush slidably mounted in a socket in the other end portion of the link member, the arrangement being such that the link member forms an articulated connection whereby rotary movement of the first cross shaft imparts a rotary movement to the selector shaft, a third crank arm which is carried by the second cross shaft and means connecting said third crank arm to the selector shaft such that rotary movement of the second cross shaft imparts an axial movement to the selector shaft, first and second actuator levers fixed to one end of the respective cross shafts, and first and second axially movable rods which are pivotally connected to the respective actuator levers, 4. A gear selector mechanism according to claim 3, in which the axially movable rods are disposed in a common plane and extend in a direction generally parallel to the selector shaft.

5. A gear selector mechanism comprising a housing, a selector shaft, first and second cross shafts rotatably mounted in the housing transversely to the selector shaft, said selector shaft being mounted for both axial and rotary movement relative to the housing, a first crank arm carried by the first cross shaft, a hinge connection comprising a crank pin which is carried by said crank arm and extends into an elongated hollow boss on one end portion of a link member such that the link member can move in one plane only, a second crank arm which is carried by the selector shaft and has a spherically-surfaced free end portion engaging a corresponding part-spherical internal surface of a bearing bush that is slidably mounted in a socket in the other end portion of the link member, the arrangement being such that the link member forms an articulated connection whereby rotary movement of the first cross shaft imparts a rotary movement to the selector shaft, and a third crank arm in said housing which is carried by the second cross shaft and has at a free end thereof a projecting crank pin which extends into a circumferential groove in the selector shaft and within said housing such that rotary movement of the second cross shaft imparts an axial movement to the selector shaft.

6. A gear selector mechanism comprising first and second cross shafts rotatably mounted in a housing transversely to a selector shaft which is mounted for both axial and rotary movement, a first crank arm carried by the first cross shaft, a hinge connection comprising a crank pin which is carried by said crank arm and extends into an elongated hollow boss on one end portion of a link member such that the link member can move in one plane only, a second crank arm which is carried by the selector shaft and has a spherically-surfaced free end portion engaging a corresponding part-spherical internal surface of a bearing bush that is slidably mounted in a socket in the other end portion of the link member, the arrangement being such that the link member forms an articulated connection whereby rotary movement of the first cross shaft imparts a rotary movement to the selector shaft, a third crank arm which is carried by the second cross shaft and has at a free end thereof a projecting crank pin which cooperates with a circumferential groove in the selector shaft such that rotary movement of the second cross shaft imparts an axial movement to the selector shaft, first and second actuator levers each fixed to one end of a respective one of the cross shafts, and first and second axially movable rods which are pivotally connected to the respective actuator levers.

7. A gear selector mechanism comprising first and second cross shafts rotatably mounted in a housing transversely to a selector shaft which is mounted for both axial and rotary movement, a first crank arm carried by the first cross shaft, a hinge connection comprising a crank pin which is carried by said crank arm and extends into an elongated hollow boss on one end portion of a link member such that the link member can move in one plane only, a second crank arm which is carried by the selector shaft and has a spherically-surfaced free end portion engaging a corresponding part-spherical internal surface of a bearing bush that is slidably mounted in a socket in the other end portion of the link member, the arrangement being such that the link member forms an articulated connection whereby rotary movement of the first cross shaft imparts a rotary movement to the selector shaft, a third crank arm which is carried by the second cross shaft and has at a free end thereof a projecting crank pin which cooperates with a circumferential groove in the selector shaft such that rotary movement of the second cross shaft imparts an axial movement to the selector shaft, first and second actuator levers which are disposed on the same side of the housing and are fixed to the ends of the respective cross shafts, and first and second axially movable rods which are disposed in a common plane and extend in a direction generally parallel to the selector shaft and are pivotally connected to the respective actuator levers.

References Cited

UNITED STATES PATENTS

| 2,312,975 | 3/1943 | Peterson et al. | 74—473 |
| 2,517,871 | 8/1950 | Gustafson | 74—473 |
| 3,264,893 | 8/1966 | Stott et al. | 74—477 |

FOREIGN PATENTS

| 848,973 | 9/1960 | Great Britain. |

MILTON KAUFMAN, Primary Examiner